United States Patent [19]
Marchesi

[11] Patent Number: 5,453,202
[45] Date of Patent: Sep. 26, 1995

[54] METHOD FOR TREATMENT OF IMPOUNDED SLUDGES, SOILS AND OTHER CONTAMINATED SOLID MATERIALS

[75] Inventor: Primo Marchesi, Lock Haven, Pa.

[73] Assignee: American Color & Chemical Corporation, Lock Haven, Pa.

[21] Appl. No.: 55,432

[22] Filed: Apr. 29, 1993

[51] Int. Cl.⁶ .................................................. C02F 9/00
[52] U.S. Cl. .................... 210/669; 210/694; 210/768; 210/806
[58] Field of Search ................... 210/663, 665, 210/669, 694, 713, 751, 770, 806, 668, 754, 768

[56] References Cited

U.S. PATENT DOCUMENTS

| | | | |
|---|---|---|---|
| 1,747,175 | 2/1930 | Mahler. | |
| 3,573,202 | 3/1971 | Sobota et al. | 210/5 |
| 3,640,820 | 2/1972 | Kemmer et al. | 210/6 |
| 3,652,407 | 3/1972 | Paleos | 210/27 |
| 3,772,191 | 11/1973 | Thorn | 210/44 |
| 3,783,128 | 1/1974 | Thompson | 210/27 |
| 3,803,033 | 4/1974 | Sutherland | 210/40 |
| 3,846,293 | 11/1974 | Campbell | 210/18 |
| 4,005,011 | 1/1977 | Sweeny | 210/18 |
| 4,008,161 | 2/1977 | Wong et al. | 210/30 R |
| 4,038,180 | 7/1977 | Talbert | 210/10 |
| 4,163,715 | 8/1979 | Ikari et al. | 210/28 |
| 4,165,289 | 8/1979 | Borst | 210/27 |
| 4,221,661 | 9/1980 | Shimizu et al. | 210/721 |
| 4,514,307 | 4/1985 | Chestnut et al. | 210/751 |
| 4,517,094 | 5/1985 | Beall | 210/664 |
| 4,581,144 | 4/1986 | Marchesi | 210/667 |
| 4,676,908 | 6/1987 | Ciepiela et al. | 210/638 |
| 5,087,378 | 2/1992 | Kovacs | 210/770 |

*Primary Examiner*—Ivars Cintins
*Attorney, Agent, or Firm*—Ernestine C. Bartlett

[57] ABSTRACT

A novel and improved method is provided for treatment of materials contaminated with environmentally significant amounts of volatile and semi-volatile organic pollutants, the method including the essential steps of fluidization, acidification, and filtration of a contaminated solids material to yield a first treated solids product; recycling of the first treated solids product and admixture of the recycled first treated solids product with additional contaminated solids product; and continuously subjecting a mixture of first treated solids product and contaminated solids product to fluidization, acidification, filtration, recycling, and admixture until a product exhibiting predetermined characteristics is produced.

19 Claims, 1 Drawing Sheet

METHOD FOR TREATMENT OF IMPOUNDED SLUDGES, SOILS AND OTHER CONTAMINATED SOLID MATERIALS

FIELD OF THE INVENTION

This invention relates to a method for the treatment of contaminated materials comprising a solid matrix such as, for example, contaminated soils, sludges, sediments, particulate fill, and the associated waste water, the method involving the steps of solubilizing solids, volatilizing organic constituents that are pollutants, and drying the resultant material to a predetermined level for remediation of such contaminated materials to conform to environmental standards.

BACKGROUND OF THE INVENTION

Various environmental laws regulate the discharge or disposal of waste materials into natural streams, municipal sewers, land surfaces, or underground reservoirs since these materials usually contain hazardous or undesirable concentrations of contaminants. Generally, these environmental regulations prohibit the concentration levels of the contaminants (pollutants) from exceeding specific limits which have been determined to ensure a relatively safe environment. The disposal of materials with contaminant levels that exceed these limits is a major problem of growing complexity particularly in view of ever increasing amounts of such materials for disposal and in view of stricter state and federal environmental regulations.

There are many industrial and commercial sites in need of decontamination either because of ongoing operations that generate hazardous waste materials that must be disposed of or because of accumulated waste materials that have not been processed to reduce the contaminants to meet the proscribed limits. The clean-up or remediation of contaminated industrial sites in particular has heretofore presented problems primarily because of the expense and time involved and the tremendous energy requirements that accompany the methods that have been available.

The conventional methods for the cleanup of contaminated sites include: (1) dewatering of sludges, treating the liquid phase, and land disposing the solid phase (filter cake); (2) vaulting in place using slurry walls and stabilization agents; (3) incineration; and (4) thermal desorption. Methods (1) and (2) can be eliminated if the material is covered by EPA Land Disposal Restrictions (LDR) which require that these LDR waste materials meet the applicable treatment standard before subsequent placement in or on the land. If LDR applies, incineration is usually the selected method of disposal. However, incineration is very unpopular with the public often creating additional environmental concerns. For example, incineration in the presence of water and oxygen may result in the formation of dioxins/furans which are known to be extremely toxic and in all likelihood are more hazardous than the initial contaminant that was incinerated. As a result, incineration permits for off-site processing are often either unavailable or very difficult to obtain. Moreover, even when such permits are obtained, on-site incineration may add up to 50% to 300% of additional expenses to the cleanup costs, due to large volumes of combustion gases that will require air handling and treatment equipment such as water quenchers, dust collectors, and water scrubbers. Moreover, the wastes (e.g.,ash) from the incineration process may require disposal in a secured land fill. Since incineration generally results in little volume reduction, disposal costs for the waste ash can be significant. Off-site incineration can add additional costs associated with packaging and transporting the waste materials to the incineration site. Off-site incineration can add up to 30% to 50% of additional costs to the on-site incineration costs. Additionally, off-site incineration can add months to the completion of the cleanup due to low incineration capacity nationwide. Both on-site and off-site incineration can result in residual wastes that are covered by RCRA, resulting in additional encapsulation costs for disposal of the residual wastes generated by the incineration.

The provision of a method for cleaning up sludges or contaminated soils or other contaminated solid waste materials that does not involve on-site or off-site incineration is an increasingly critical need in the art. The problem is particularly acute with industrial sites that contain lagoons, i.e., sludge holding ponds because of the high water content of the sludges, typically requiring dewatering steps before incineration.

One method for decontamination of contaminated sites is thermal desorption, a physical separation process employed for the removal of organics from many types of solid materials such as sludges, filter cakes, and soil materials which is typically carried out using a direct fired rotary drum followed by a baghouse, thermal oxidizer (afterburner or incinerator for gases), water quench to cool the gases, packed scrubber, and stack for emission of gases. Additionally, various systems have been proposed that use direct or indirect heat exchange to achieve bed temperatures of 200° to 1000° F. with oil or combustion gas as the transfer medium. Residence times typically depend on contaminant vapor pressures, sludge conditions, operable variables, and applicable remediation criteria. Residual treatment requirements typically include those for oversized reject, offgases and water. Particulate control systems are also required. Offgas treatment typically includes both thermal oxidation (at temperatures above 1,600° F.) to burn the organics and scrubbing units to remove chemicals such as HCl. Such off-gas treatment is generally significant in terms of cost and meeting regulatory requirements. Although thermal desorption is a proven method for the removal of organics, regulatory agencies often require significant treatability testing and other measures (e.g., test burns) to ensure that there are no emissions problems and that the organics are not transformed into more toxic products as a result of the thermal desorption or offgas treatment processes.

Novel and improved methods utilizing thermal desorption treatment methods are described and claimed in copending U.S. patent application Ser. No. 055,428 entitled METHOD FOR TREATMENT OF CONTAMINATED MATERIALS WITH SUPERHEATED STEAM THERMAL DESORPTION AND RECYCLE, and U.S. patent application Ser. No. 055,433 entitled METHOD AND APPARATUS FOR SOIL REMEDIATION WITH SUPERHEATED STEAM THERMAL DESORPTION AND RECYCLE, both filed concurrently and commonly assigned herewith, the disclosures of which are incorporated by reference.

In U.S. Pat. No. 4,581,144, the subject matter of which is also incorporated herein by reference, there is disclosed a method for treating sludges that result from the chemical treatment of spent sulfuric acid with lime, and in particular a method for solubilizing the solids and reducing the color and total organic content of the treated material to a predetermined level. Such method is highly effective for the stated purpose but still involves a certain amount of incineration. The present invention takes advantage of an embodiment of the patented process in that impounded sludges are subjected to the steps of fluidization, dilution, acidification, clarification, carbon adsorption, and reacidification as in said patented method. However, it has now been found that the steps of blending a portion of recycled bottoms with spent carbon and incineration, previously thought to be essential, may be eliminated. As a result, a vastly improved method may be provided.

Prior to the present improved method, and those of said copending applications, no known method has been available for the cleanup of contaminated solid materials, without incineration, that is portable and compact, multi-stage, optionally continuous, at least as cost effective as the non-incineration conventional methods mentioned above, and significantly more cost effective than methods which involve incineration.

SUMMARY OF THE INVENTION

An object of this invention is the provision of a method and system for the treatment of contaminated materials comprising a solid matrix such as sludges and soil without incineration wherein the levels of prohibited organic materials or organic pollutants present in the treated materials are within the limits prescribed by state and federal environmental regulations for disposal in or on land, and wherein RCRA and CERCLA regulations for remediation are readily and efficiently met at a cost that is significantly cheaper than conventional methods.

Another object of the invention is to provide a cost effective method for the remediation of contaminated sites to meet the limits required by environmental regulations wherein contaminated soils or sludges are conditioned and fluidized, subjected to an acid extraction step according to the invention, and wherein residual organic pollutants contained in said treated materials are steam stripped and condensed, whereby the amount of both moisture and organic pollutants contained in said sludges or soils are reduced to a concentration that is not greater than the concentrations prescribed by governmental regulations, and the material after cleanup is suitable for replacement or emplacement into the site from which it originated, on-site or off-site, all without the need for incineration.

Yet another object of the invention is to provide a cost effective method for the remediation of contaminated sites wherein contaminated soils or sludges containing a solid matrix are solubilized, volatilizable pollutants including volatile and semivolatile organic compounds or pollutants contained therein are desorbed or separated from said solid matrix, and the solubilized mass after cleanup is suitable for replacement or implacement into the site from which it originated, all without the need for incineration.

These and other objects will be apparent from the description of the invention which follows which when taken in connection with the drawing describe preferred embodiments of the invention.

According to the invention, there is provided a novel and improved method for treatment of materials contaminated with environmentally significant amounts of volatile and semivolatile organic pollutants, said method comprising the essential steps of fluidization, acidification, and filtration of a contaminated material comprising a solid matrix to yield a first treated solids product; recycling of the first treated solids product and admixture of the recycled first treated solids product with additional contaminated material, and continuously subjecting a mixture of first treated solids product and contaminated material to fluidization, acidification, filtration, recycling, and admixture until a product exhibiting predetermined characteristics is produced.

Specifically, a method is provided which comprises the steps of:

(1) subjecting the contaminated material to a fluidization and conditioning treatment;

(2) reacting the fluidized, conditioned contaminated material with hydrochloric acid to a concentration of about 10% to 200% HCl on a dry solids basis;

(3) filtering the acidified mass to provide a liquid stream, for clarification of effluent and recycling of solids bottoms recovered therefrom, and a filter cake in which the concentration of organic pollutants is substantially less than the concentration of said pollutants present in said original contaminated material;

(4) subjecting the clarified effluent to filtration and carbon adsorption to remove constituents therefrom including volatile organic compounds (VOCs) and semi-volatile organic compounds (SVOCs);

(5) recycling solids bottoms from the clarifier for reconditioning and fluidization, if necessary, and admixture with conditioned, fluidized contaminated material; and (6) continuously subjecting a mixture of recycled solids and contaminated material to the steps of fluidization, acidification, and filtration until a product having a pollutant content that is not greater than predetermined concentrations of pollutants is obtained, wherein:

the conditions in the acidification reactor are such that gases are evolved and contaminants are separated from the acidified material, the method being effective to provide a final treated product that complies with specified governmental environmental standards in a high rate, efficient, comparatively low cost manner so as to promote waste management practices that provide for reclamation of contaminated sites and materials without further harm to environmental quality.

In the preferred embodiment of the invention, the method is for treating contaminated sludge or soil and comprises mechanical fluidization and conditioning of the sludge or soil. Water at a preselected ratio of the mass is added for pumpability and to minimize foaming, and then the mass is acidified by the addition of a suitable acid, for example HCl. The acidified material is filtered to concentrate solids and to produce effluent which is passed through activated carbon. Solids from the clarifier are recycled for reacidification thereby causing solubilization of additional solids. The process is preferably continuous since the continuous reacidification of the recycled solids with acidification of additional sludges or soils reduces initial solids content and improves volatilization of organic contaminants such as VOCs and SVOCs.

The amounts of water used for fluidization may vary considerably depending on the particular contaminated material being treated. Satisfactory results have been obtained with water used in amounts of 5 to 10 parts water to 1 part of the material (on a dry solids basis) as it is fed to the process, be it sludge, soil, etc. Ideally, about 1 to 5 pounds of water for every pound of sludge is used.

Similarly, the amount and concentration of the acid employed may vary depending on the nature of the contaminated material under consideration. Satisfactory results have been obtained with HCl in a ratio of 10% to 200% for each pound of sludge on a dry solids basis. Preferably, about 0.1 to 1.0 pound of HCl for every pound of material on a dry weight basis is used.

It has been found that with proper adjustment of the amount and concentration of HCl relative to the conditioned and fluidized sludge, up to approximately 50% to 90% of the sludge solids may be dissolved and removed by further treatment.

Additionally, while the invention is being described in terms of HCl, other acids may be employed depending on the material being treated including nitric, sulfuric, citric, etc.

In terms of equipment necessary to carry out the method of this invention, conventional means and apparatus for conditioning, acidifying, filtering, and carbon adsorption are employed except that it is essential that the acidification reactor be such that organic pollutants are volatilized into a gas phase and removed from the system and treated with carbon or other adsorption means. Preferably, VOCs and SVOCs are educted through a gas phase carbon adsorber and adsorbed without emission to the atmosphere exceeding regulatory criteria.

The method is applicable to contaminated materials of various types including surface impoundments containing sludges, contaminated soils that can be excavated, optionally made into slurries, treated and redeposited in an excavation as fill. Other suitable materials include solid materials contaminated with or originating from, for example, industrial chemicals and synthetics, specialty chemicals, steel, coke, and coal-tar chemicals; contaminated materials from the electronics industry; commercial waste such as that originating from dry cleaning, gasoline stations, and machine shops of various types; domestic waste such as sewage; liquid and gas phases separated from such materials, etc.

The method is particularly well adapted for use in conjunction with a method and apparatus for remediation of contaminated materials as described and claimed in the above referred to copending U.S. application Ser. No. 055, 428 entitled METHOD FOR TREATMENT OF CONTAMINATED MATERIALS WITH SUPERHEATED STEAM THERMAL DESORPTION AND RECYCLE, and U.S. application Ser. No. 055,433 entitled METHOD AND APPARATUS FOR SOIL REMEDIATION WITH SUPERHEATED STEAM THERMAL DESORPTION AND RECYCLE, both filed concurrently, the subject matter of which is incorporated herein by reference thereto, the combined methods being particularly effective as a low thermal desorption method for remediation of contaminated sites. According to such a method, a filter cake obtained from the process of this invention is conditioned, if necessary, and residual organic pollutants are volatilized and condensed whereby the amount of both moisture and organic pollutant compounds contained in the filter cake are reduced, and the solid mass obtained after treatment is suitable for replacement or emplacement into the site from which it originated, all without the need for incineration. Specifically, the filter cake may be subjected to an improved system and method for treatment of materials contaminated with environmentally significant amounts of organic pollutants, said method comprising the essential steps of (1) providing apparatus means comprising a closed vessel, a superheater, and components adapted to associatively cooperate one with the other as a closed loop system; (2) contacting a filter cake produced as described above and comprising a solid matrix and residual amounts of organic pollutants in said apparatus means with superheated steam for a period sufficient to vaporize water contained in said filter cake and to convert the same to superheated steam; and (3) continuously recycling superheated steam in said apparatus means to continuously contact said filter cake until said filter cake contains a predetermined amount of moisture and organic pollutants wherein:

the superheated steam is fed to contact the filter cake from a source that is outside the closed loop system until a pre-selected temperature has been reached sufficient to vaporize water contained in said contaminated material and to convert the same to superheated steam and thereafter the apparatus means is operated as a closed loop system, the contacting with said superheated steam being effective to dry the solid matrix and to separate organic pollutants that are volatilizable at the pre-selected temperature in the vessel.

In a preferred embodiment of the invention, the filter cake derived by the method of this invention is subjected to further treatment by a method comprising the essential steps of subjecting the filter cake comprising a solid matrix to the action of superheated steam in a closed vessel under conditions wherein components thereof are separated from the solid matrix, and recycling said superheated steam to said closed vessel to contact said solid matrix whereby said solid matrix is dried and organic pollutant compounds are separated therefrom to yield a product in which the content of organic pollutant compounds are not greater than the concentrations that are environmentally insignificant and within the limits prescribed by governmental regulations.

According to one embodiment of the process of the invention, the filter cake may be conditioned or comminuted by a delumping operation for material uniformity and increased surface areas, if desired, although such is not normally required. The conditioned material is charged into a reactor such as for example a rotary drum. Superheated steam at temperatures 250° to 1000° F. is then sparged through the bed of solids to be treated and is recycled from the reactor through a steam superheater that increases steam temperature and is then re-sparged through the bed. Steam is supplied from a steam generator until pre-selected temperature and pressure conditions in the closed vessel are achieved. When preselected temperatures and pressures have been reached, the steam is then generated from the moisture contained in the solids that was charged to the closed vessel, and the system operates as a closed loop. The vapor phases, both steam and organics, are removed from the column and are condensed and/or recycled through the column. This operation is controlled by a positive displacement blower that supplies the motive force for sparging steam into the closed vessel and extracting vapors from the closed vessel for condensing or recycling. These steps are continued until the desired cleanup results have been met.

Specifically, a method is provided which comprises the steps of:

(1) optionally, subjecting the filter cake to a conditioning treatment with or without fluidization;

(2) charging said material into a closed vessel which associatively cooperates with a superheater and other components of an apparatus to function as a closed loop system;

(3) feeding superheated steam through the closed vessel;

(4) feeding a portion of a gas stream comprising superheated steam exiting the closed vessel to a steam superheater that increases the temperature of the superheated steam and recycling the superheated steam to the closed vessel;

(5) discontinuing the superheated steam feed to the closed vessel after a pre-selected temperature is reached whereby steam is generated from the moisture contained in said contaminated material present in the closed vessel;

(6) removing vapor phases from said closed vessel;

(7) condensing said removed vapor phases;

(8) optionally, replacing said superheated steam in steps (3) and (4) above with nitrogen to cause evaporation of moisture entrained in the contaminated material to generate superheated steam where steam generators are either unavailable or undesirable;

(9) optionally, condensing a minor portion of the removed vapors; separating the condensed portion, and recycling the treated water phase; and recovering the organic constituents that are volatilizable at the pre-selected temperature in the vessel; and

(10) continuously subjecting contaminated material to the steps of drying and volatilizing until a product exhibiting satisfactory levels of constituents is obtained, the method being effective to provide a solid product that complies with specified governmental environmental standards in a high rate, efficient, comparatively low cost manner so as to promote waste management practices that provide for reclamation of contaminated sites and remediation of materials without further harm to environmental quality.

The use of the filter cake in the combined method is believed to permit separation of organic pollutant compounds at atmospheric pressure from contaminated solids at temperatures that are much lower than their normal boiling points without the necessity of operating under vacuum conditions. It is well known that the exact theory and mechanism of how liquids and vapors are released from solid matrices of inert materials such as soils and sludges is complex and unknown. For example, it has been postulated that factors such as the structure of the solids in a given inert material, the type of contaminant, the presence or absence of other contaminants in the inert material, the concentration of contaminants, and the saturation of the gas phase may all, simultaneously, influence the mechanism by which internal liquids flow through, and vaporize from, a given inert material. (See U.S. Pat. No. 5,103,578 for a discussion of some of the complexities involved.) In the present case, as indicated above, the use of superheated steam is believed to reduce the partial pressure of waste organic components permitting their removal or stripping at atmospheric pressure from contaminated solids at temperatures that are much lower than their normal boiling points without the necessity of operating under vacuum conditions.

Whether the method of the present invention is used in conjunction with the method of said copending applications U.S. Ser. No. 055,428 and U.S. Ser. No. 055,433 described above or as a stand alone treatment, the invention is effective to provide a new method for treatment of contaminated solids that is not available today, eliminates the large volumes of gases associated with direct fired soils dryers, and enables the recovery of condensed organic components.

BRIEF DESCRIPTION OF THE DRAWINGS

The Figure is a schematic diagram illustrating the method of the invention.

DETAILED DESCRIPTION OF PREFERRED EMBODIMENTS

Figure 1:
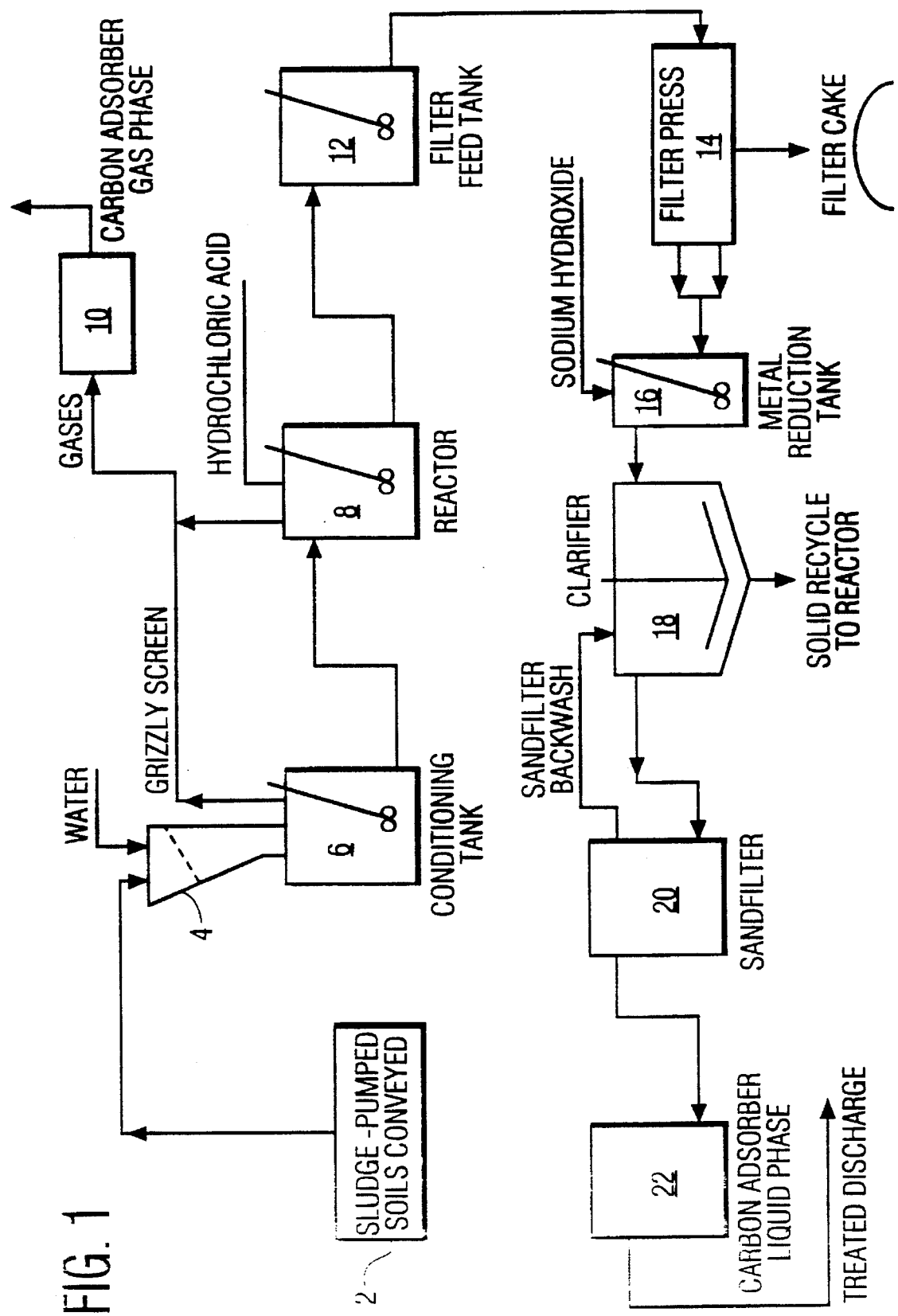

The following are specific pilot-plant scale examples in which the present invention has been demonstrated. In each case, standard laboratory methods were used to determine the VOC, SVOC, and other characteristics of the materials described further hereinbelow.

TABLE 1

| IMPOUNDED SLUDGE CHARACTERISTICS | |
|---|---|
| % Moisture | 75 to 80 |
| Color | 5,000 APHA units |
| Nitrobenzene concentration | 40 to 100 mg/l. |
| California List of HOCs* | >2,000 mg/l. |

*Chlorobenzene, p-chloroaniline, 1,2-dichlorobenzene, 1,3-dichlorobenzene, and 1,4-dichlorobenzene. These five compounds represent the California HOC List compounds that are present in high concentrations in the sludge starting material.

Referring to the Drawing, impounded sludge 2 having the characteristics indicated in Table 1, for example a semi-solid sludge formed by the neutralization with lime of a sulfuric acid effluent contaminated with environmentally significant amounts of organic solvents and by-products resulting from the production of synthetic dyes and related intermediate chemicals, or contaminated with the same, is the starting material. 80 to 100 tons per day of sludge are pumped or conveyed to a grizzly screen 4, where the material is screened to remove solids larger than a predetermined size. The screened sludge is processed with 5 to 10 parts water which is added through the grizzly screen into the conditioning tank 6, where the diluted sludge is homogenized by means well known in the art. Following the conditioning and fluidization steps, the mass is transferred to the reactor 8, for acidification. HCl is added to the mass in an amount equal to about 10% to about 200% of the dry solids. During the reaction, gases are formed which are educted through a gas phase carbon adsorber 10, where organic contaminants including VOCs and SVOCs are adsorbed without emission to the atmosphere. Following completion of the reaction, the acidified material is pumped to the filter feed tank 12 from which it is fed as desired to the filter press 14. The filtrate stream is then directed to a metals reduction tank 16, if necessary, for metal reduction via reaction with NaOH or the like, after which the stream is pumped to clarifier 18 and to the sand filter 20.

The filter cake from the filtration step was analyzed and found to be suitable for emplacement in the impoundment or excavation from which it originated. The filtrate, after sand filtration, is directed through activated carbon adsorber 22 for treatment. There is recovered from the above-described process a filtered solid and effluent having the characteristics listed in Table 2.

TABLE 2

| 1. FILTER CAKE CHARACTERISTICS AFTER TREATMENT | |
|---|---|
| % Moisture | 60 to 65 |
| Volume Reduction | 25 to 50% |
| Nitrobenzene | <10 mg/l. |
| California List of HOCs | <1,000 mg/l. |
| 2. FILTRATE CHARACTERISTICS | |
| Color | 5 APHA units |

TABLE 2-continued

| | |
|---|---|
| Nitrobenzene | <1 mg/l. |
| California List of HOCs | <1 mg/l. |

The invention may be embodied in other specific forms without departing from the spirit and scope or essential characteristics thereof, the present disclosed examples being only preferred embodiments thereof.

When the filter cake is used in the combined method, the closed vessel utilized in the method may be of a construction well known in the art. Preferably, a pressurized rotary drum is employed. Such a closed vessel may be operated as a fixed bed (batch method), or as a pulsed bed (continuous method), depending on the particulars of the materials being treated, as described further hereinbelow.

Operating conditions may vary depending on the boiling points of the organic components to be removed or vaporized. Steam temperatures ranging from saturated steam at 250° F. to superheated steam at 1600° F. may be employed. Steam may be introduced to flow through the closed vessel in an upflow (cocurrent) or in a downflow (countercurrent) using steam as required or dictated by process requirements.

It is imperative that the respective essential steps and the required procedure embodying those steps be carried out in the proper sequence. Therefore, the fluidization and conditioning must be carried out before acidification, and solids must be recycled to the conditioning tank and/or reactor for reacidification and admixture with untreated sludge material. The significance of this sequential feature is that solids will be continuously reduced and removal of VOCs and SVOCs will be increased and more complete.

The method of this invention is applicable to contaminated materials of various types including surface impoundments containing sludges; contaminated soils that can be excavated, made into slurries, treated and redeposited in an excavation as fill as described above.

The method and system of the invention have been found to have several inherent advantages: (A) the process is quite flexible with a wide variety of operating temperatures and residence times; (B) the process has no significant capital/operating cost requirements for offgas treatment; (C) the process is effective to remove a variety of contaminants including such organics as halogenated volatiles, halogenated semivolatiles, nonhalogenated volatiles, nonhalogenated semivolatiles, polychlorinated biphenyls (PCBs), pesticides, dioxins/furans, organic cyanides, organic corrosives, and inorganics such as volatile metals and the like.

What is claimed is:

1. A method for treatment of materials contaminated with volatile and semi-volatile organic pollutant compounds, said method consisting essentially of the steps of (1) subjecting said contaminated material to a size reduction operation and fluidization step; (2) acidifying a solid or semi-solid contaminated material comprising a solid matrix and at least one organic pollutant compound in a reactor; (3) subjecting the acidified material to filtration to yield a treated solids product; (4) recycling the treated solids product to the reactor and admixing the recycled treated solids product with additional contaminated material; and (5) continuously subjecting a mixture of treated solids product and contaminated material to said fluidization, acidification, filtration, recycling and admixture steps until a product is produced that exhibits a pollutant content that is not greater than a predetermined amount.

2. A method as claimed in claim 1 wherein said fluidization is obtained by addition of water to said contaminated material in amounts of about 5 to about 10 parts of water per part of said contaminated material.

3. A method as claimed in claim 2 wherein said contaminated material is sludge.

4. A method as claimed in claim 3 wherein from about 1 to 4 pounds of water for every pound of sludge is used for fluidization.

5. A method as claimed in claim 3 wherein about 0.1 to 1.0 pounds of HCl per pound of sludge on a dry solids basis is used for acidification.

6. A method as claimed in claim 5 wherein up to approximately 90% of the sludge solids are dissolved.

7. A method as claimed in claim 1 wherein acidification is obtained with HCl in an amount of 10% to 200% on a dry solids basis.

8. A method as claimed in claim 1 wherein the contaminated material is impounded sludge.

9. A method as claimed in claim 8 wherein said impounded sludge is a semi-solid sludge formed by the neutralization with lime of a sulfuric acid effluent contaminated with amounts of organic solvents and by-products resulting from the production of synthetic dyes and waste water.

10. A method as claimed in claim 1 wherein the contaminated material is contaminated soil.

11. A method for treatment of materials contaminated with amounts of volatile and semi-volatile organic pollutant compounds, said method being conducted without an incineration step and comprising the steps of:

(1) subjecting the contaminated material to a fluidization and conditioning treatment;

(2) reacting the fluidized, conditioned material in a reactor with hydrochloric acid to a concentration of about 10% to 200% HCl on a dry solids basis to provide an acidified mass;

(3) filtering the acidified mass to provide a liquid stream and a filtercake;

(4) clarifying said liquid stream to provide a clarified effluent subjecting the clarified effluent to filtration and carbon adsorption to remove VOCs and SVOCs;

(5) recycling solids bottoms from the clarifier for admixture with conditioned, fluidized contaminated material in said reactor; and (6) continuously subjecting a mixture of recycled solids and contaminated material to conditioning/fluidization, acidification, and filtration, until a product exhibiting a predetermined pollutant content is obtained.

12. A method as claimed in claim 11 wherein fluidization is obtained by the addition to said contaminated material of water in amounts of about 5 to about 10 parts of water per part of the contaminated material.

13. A method as claimed in claim 11 wherein said contaminated material is sludge and from about 1 to 4 pounds of water for every pound of sludge is used for fluidization.

14. A method as claimed in claim 8 wherein about 0.1 to 1.0 pounds of HCl on a dry solids basis is used for acidification.

15. A method as claimed in claim 14 wherein up to approximately 50 to 90% of the sludge solids are dissolved and removed.

16. A method as claimed in claim 11 wherein the contaminated material is impounded sludge.

17. A method as claimed in claim 16 wherein said impounded sludge is a semi-solid sludge formed by the neutralization with lime of a sulfuric acid effluent contaminated with organic solvents and by-products resulting from the production of synthetic dyes and waste water.

18. A method as claimed in claim 17 wherein said solids bottoms in step 5 is subjected to conditioning and fluidization before admixture in said reactor.

19. A method as claimed in claim 8 wherein the contaminated material is contaminated soil.

* * * * *